United States Patent
Norby et al.

(10) Patent No.: US 6,886,470 B2
(45) Date of Patent: May 3, 2005

(54) RAIL WELDERHEAD SHEAR APPARATUS

(75) Inventors: Robert V. Norby, Munster, IN (US); René A. Hunziker, Flossmoor, IL (US)

(73) Assignee: Holland Corporation, Crete, IL (US)

( * ) Notice: Subject to any disclaimer, the term of this patent is extended or adjusted under 35 U.S.C. 154(b) by 482 days.

(21) Appl. No.: 09/933,527

(22) Filed: Aug. 20, 2001

(65) Prior Publication Data

US 2002/0153354 A1 Oct. 24, 2002

Related U.S. Application Data

(60) Provisional application No. 60/226,232, filed on Aug. 18, 2000.

(51) Int. Cl.$^7$ ............................. E01B 11/44; B23K 9/00
(52) U.S. Cl. ........................................... 104/15; 219/54
(58) Field of Search .......................... 104/15, 2; 219/54

(56) References Cited

U.S. PATENT DOCUMENTS

| | | | | |
|---|---|---|---|---|
| 4,147,913 A | * | 4/1979 | Clews et al. | 219/97 |
| 4,272,664 A | * | 6/1981 | Theurer | 219/53 |
| 4,983,801 A | * | 1/1991 | Theurer et al. | 219/54 |
| 6,396,020 B1 | * | 5/2002 | Thelen et al. | 219/54 |

* cited by examiner

*Primary Examiner*—S. Joseph Morano
*Assistant Examiner*—Robert J. McCarry, Jr.
(74) *Attorney, Agent, or Firm*—Barnes & Thornburg LLP

(57) ABSTRACT

A flash butt rail welding welderhead combines in a single unit, the ability for the three functions of rail pulling, flash butt forging and maintaining the "after forged" displacement without any change in platen position such that shearing may be accomplished in three stages, a single stage, multiple stages or a progressive stage, all while maintaining clamping and stretching force on the rails.

7 Claims, 5 Drawing Sheets

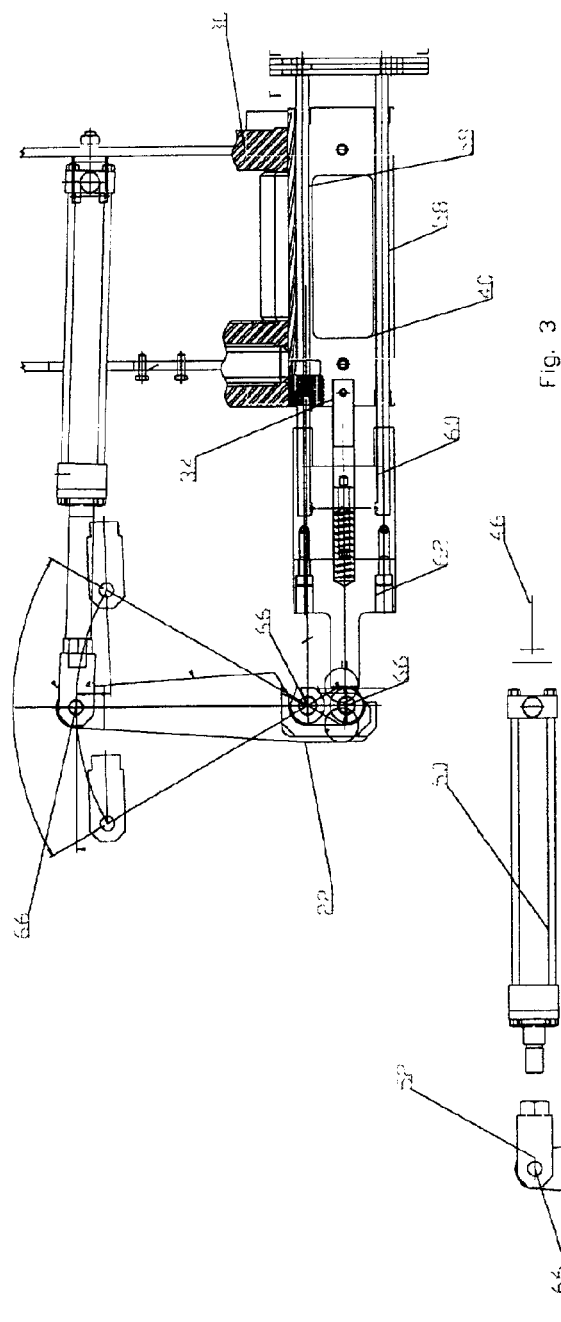
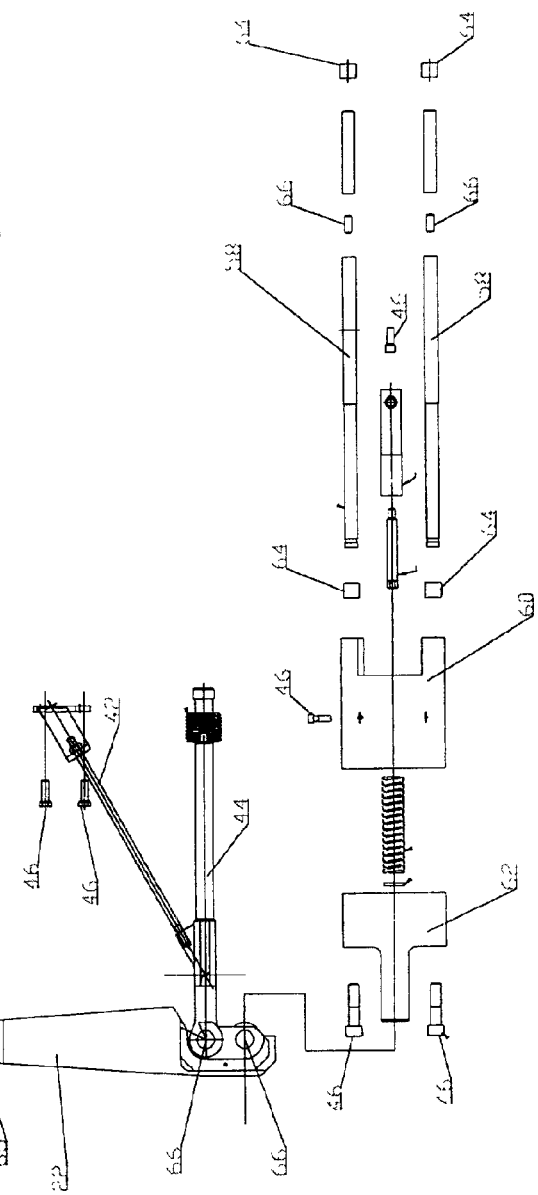
Fig. 3
Fig. 4

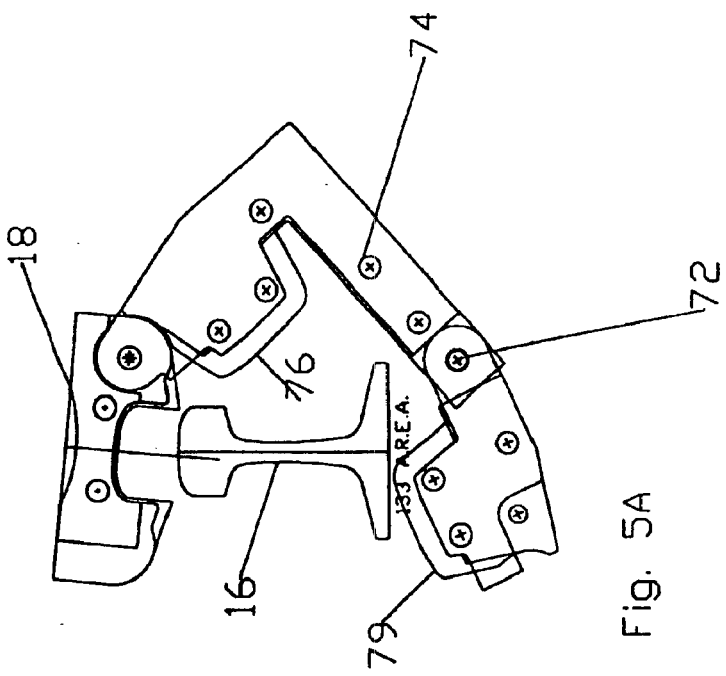
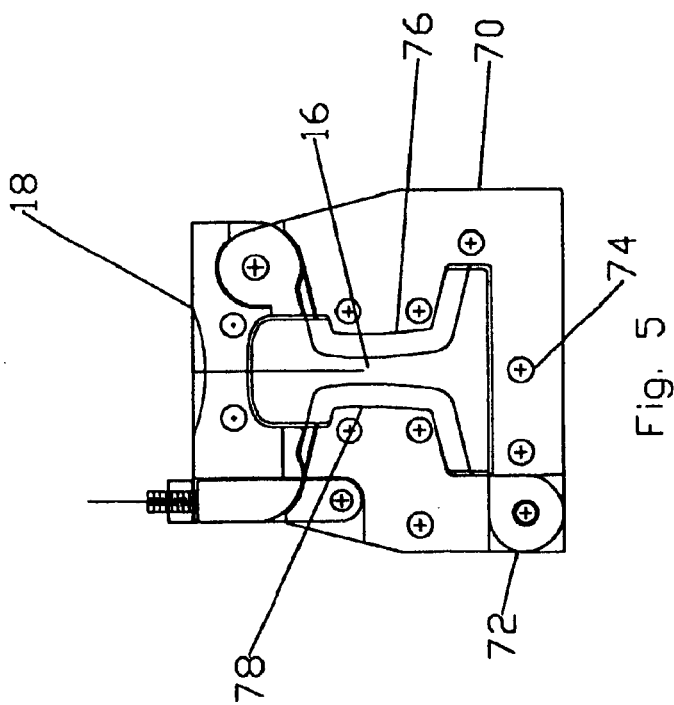

RAIL WELDERHEAD SHEAR APPARATUS

CLAIM OF PRIORITY

Priority is claimed based on our Provisional patent application Ser. No 60/226,232 filed Aug. 18, 2000 and entitled "RAIL WELDERHEAD SHEAR APPARATUS."

BACKGROUND OF THE INVENTION

1. Field of the Invention

An improved rail welderhead using extremely structurally strong quadrants, having large sections to yield high strength and the application of much larger forces in the single unit. This enables the single unit to perform tasks previously requiring separate pullers and forging-force welderheads. Because both rail stretching and tensioning and forging is done by the welderhead, it therefor becomes important to maintain tension while the weld cools. It is also desirable to shear the flash while the weld has not cooled substantially. Accordingly it is necessary to have a shear die set actuated using a high strength but compact mechanism requiring minimal clearance and operation within the area contained by the quadrants.

In this manner a single welderhead can be used for multiple purposes including pulling or stretching rail strings to flash butt forging while under tension and shear die operation without releasing rail tension and forging load.

2. Description of Related Art

In the prior art flash butt welderheads clamp rails to provide electrical contact, heating cycle movement and forging force using quadrants. Rail stretching generally requires a separate mechanism with a frame, and clamps to apply a stretching force. The stretching mechanism is left loaded as a weld is completed, one opposite pair of welderhead quadrants released to provide clearance, and a separate shear die used to remove the weld collar from the weld.

The invention enables the shearing operation within the perimeter of a fully clamped, high force welderhead that eliminates the need for the separate stretching mechanism and improves the efficiency and quality of the welds by eliminating the need to open an opposite pair of quadrants to accomplish shearing.

Railroad rails are welded using a number of different methods. One superior method in terms of weld quality is known as flash butt welding. Flash butt welding originally was developed many years ago, and has been refined over the years. Of recent significance has been the addition of the rail stretching or pulling procedure, which has heretofore been unable to be performed by the welderhead alone, in part due to the high force and concomitant strength and size requirements.

BRIEF DESCRIPTION OF THE PREFERRED EMBODIMENT

The welderhead uses a lever actuated shear die placed proximate the firebox of the welderhead. The improved shear die mechanism enables the jaws to remain fully clamped while the shear operation is accomplished. Unlike prior shear die mechanism actuators, the instant actuator enables the use of extremely strong arms on the welderhead and related structure and hydraulics that will enable the pulling of the rails themselves as well as the forging or upsetting operation while maintaining the after-forged position. Improved clearance and strength enable the elimination of many of the separate steps necessary for the combination of rail pulling, forging and shearing thereby enabling the performance of these functions smoothly and continually.

In accordance with one aspect of the present invention, a rail welderhead comprises two opposing pairs of quadrants constructed and arranged to close on adjacent rail sections and provide rail clamping by engagement of pads provided on the rail sections, the opposing pairs of quadrants defining a firebox therebetween, and a shear die fully enclosed within the firebox such that, when the welderhead's opposing quadrants are in a fully closed position, the shear die, the fully sheared weld, and the weld collar are contained within the firebox.

In one form, the shear die set is actuated through push rod and shaft assemblies. The adjacent rail sections maybe welded by flash butt rail welding. The opposing pairs of quadrants are operative to pull and stretch the adjacent rail sections. Preferably, the opposing pairs of quadrants are operative to provide forging load for the adjacent rail sections, and shear die operation is performed without releasing rail tension and forging load.

Further objects, features, and advantages of the present invention will become apparent from the following description and drawings.

BRIEF DESCRIPTION OF THE DRAWINGS

FIG. 3 is a side elevational view of the shear die actuating mechanism.

FIG. 4 is a side elevational view of the exploded shear die actuating mechanism.

FIG. 5 is a front elevational view of the shear die.

DETAILED DESCRIPTION OF THE PREFERRED EMBODIMENT

Figure 1:
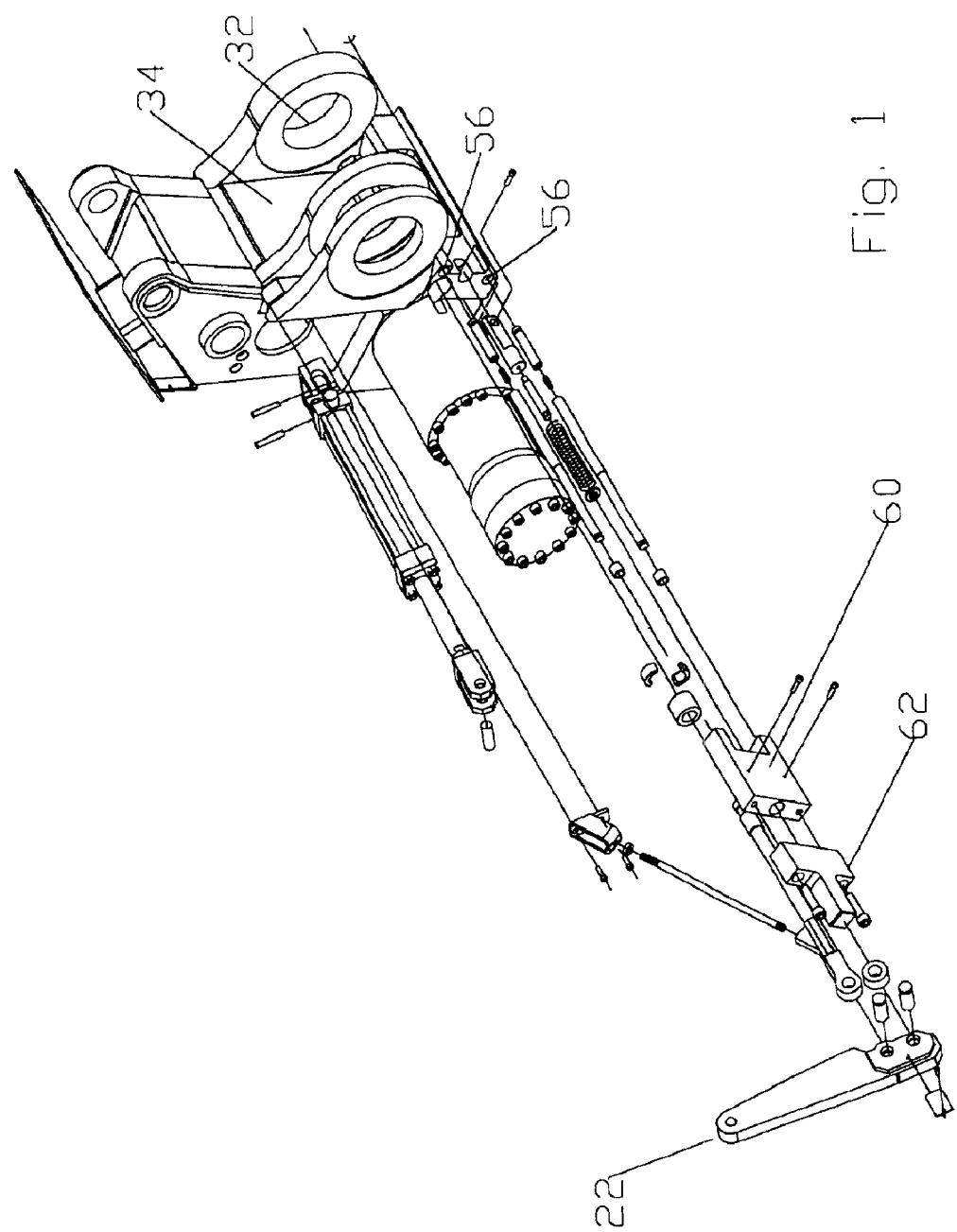
FIG. 1 is an exploded perspective view of the shear die actuating mechanism.

A flash butt rail welding welderhead 10 uses paired quadrants 12, 14 to capture ends of rails 16. A shear die set 18 is formed to correspond to the section of the cold rail 16. The shear die set 18 is put in place and actuated through push rod and shaft assemblies 20, themselves coupled to levers 22 enabling clearance in a welderhead 10 using extremely structurally strong quadrants, 12, 14, that have large sections to enable high strength and much larger forces. In this manner a single welderhead 10 can be used for multiple purposes including pulling or stretching rail strings to flash butt forging while under tension and shear die operation without releasing rail tension and forging load. The device adapted to provide these combined functions is sometimes referred to as a Puller/Welder Combo.

Figure 2:
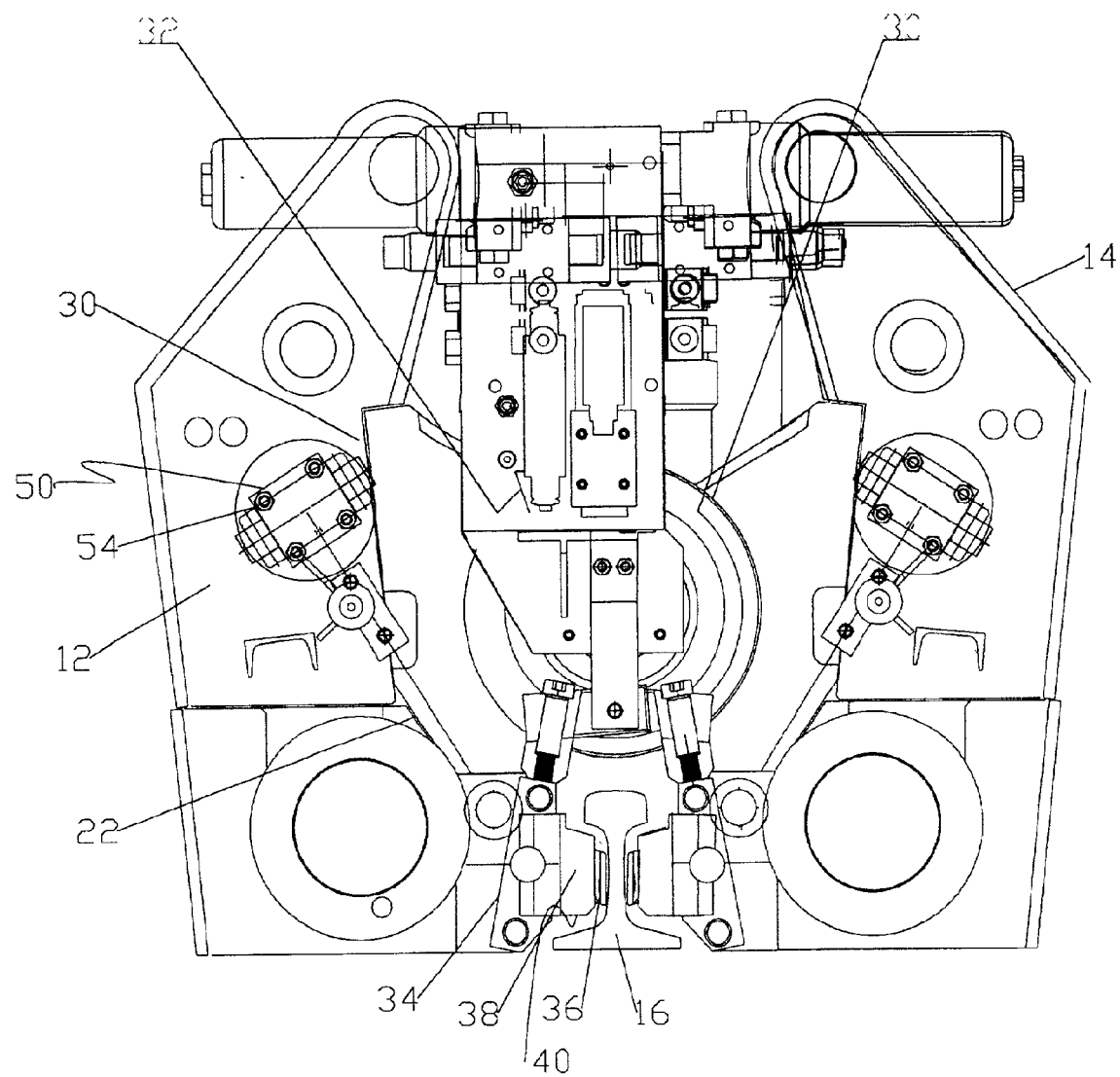
FIG. 2 is a front elevational view of the rail welderhead with the shear die actuating mechanism.
Figure 6:
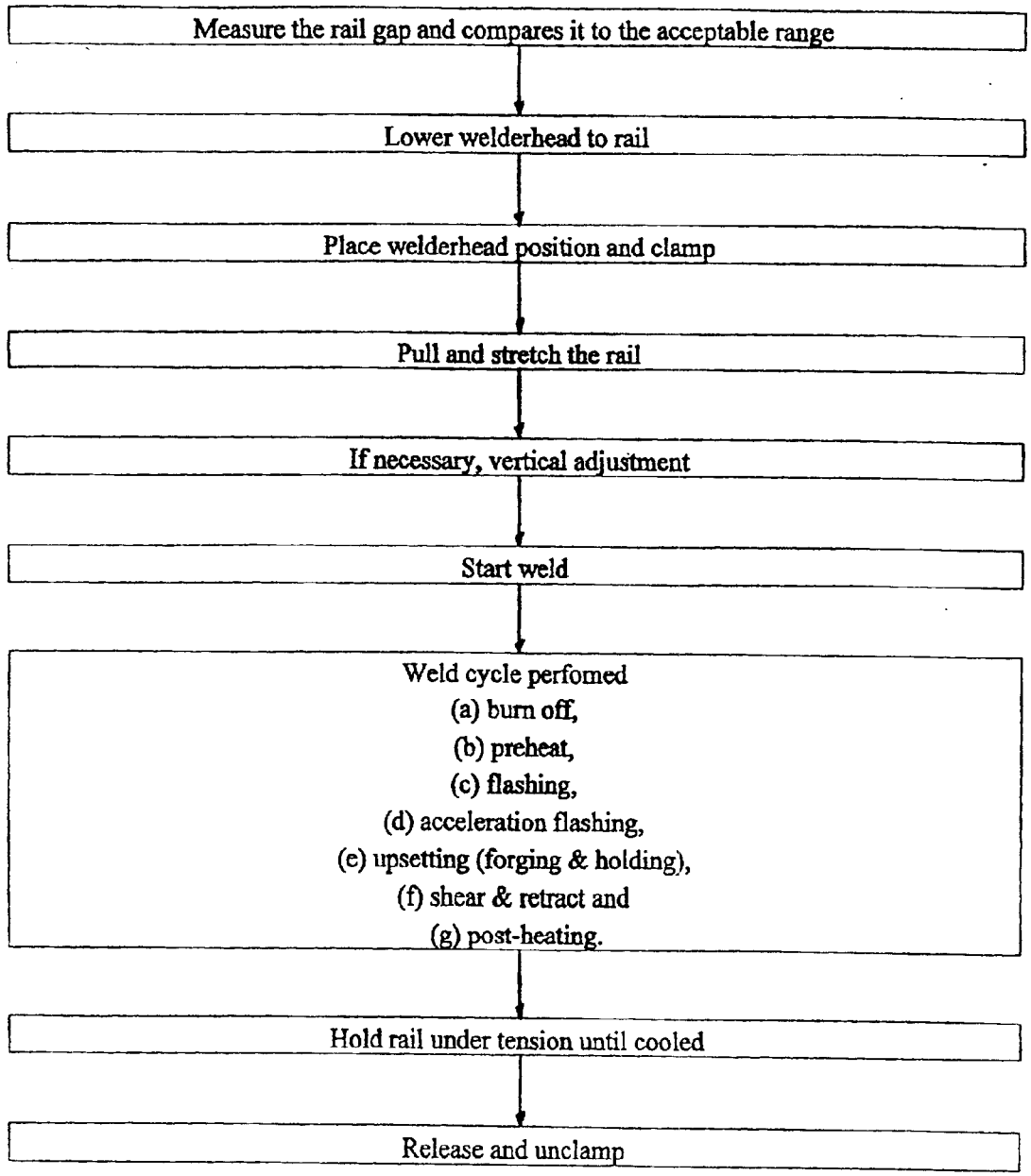
FIG. 6 is a flow chart.

The welderhead 10 has four quadrants, as is known in the art. For clarity, only the right front quadrant 12 is shown in FIGS. 1 and 3. FIG. 2 shows a pair of quadrants 12, 14. One of ordinary skill will understand the generally symmetric arrangement of the pivotally and slidably interconnected four quadrants. Quadrant 12 has trunnion 30 formed in boss 32 and arm 34 extending downward therefrom. Arm 34 holds clamping pad 36 and electrode 38 which engages rail 16 with corresponding pad 36 and electrode 38 clamp rail 16 therebetween. This welderhead arrangement enables a rail pulling and stretching capacity of 150 to about 200 tons. A capacity of 200 tons is preferred. The welderhead can also have a pushing or forging capacity.

Important in meeting these functional goals is the inclusion of an internal shearing mechanism 40 and shear die set 18 which provide a way of shearing while maintaining hold of the pads 36, 38 on the welded rail sections. The internal shearing mechanism 40 can be used with welding machines of various pulling capacities. A prior art standard 130 ton welder head does not necessarily have the pulling capacity to stretch long strings of rails and also requires a separate mechanism to maintain a forged position while a quadrant is released to provide clearance for a prior art external shear die mechanism. A 150 Ton Puller/Welder Combo is enabled by the combination of elements taught in this application.

A shear die set 18, its section corresponding to the section of the cold rail 16, is fit loosely on the cold rail 16. In the invention, the shear die set is put in place and actuated through push rods. In this manner a single welderhead can be used for multiple purposes including pulling or stretching rail strings to flash butt forging while under tension and shear die operation without releasing rail tension and forging load.

In particular, the shear die assembly 40 uses lever 22 which is supported on stay assembly 42 and reaction rod 44 against which the compressive force of shearing is borne. Various fasteners 46 will be known to one of ordinary skill. The shearing force is exerted by cylinder 5.0 acting through pin and clevis 52 attached to lever 22.

Passing through apertures 56 in arm 34 cylinder 50 and pushrod assembly 58. This provides clearance so that cylinder 50 and pushrod assembly 58 can pivot slightly at mount 54 as the end of lever 22 circumscribes an arc as it moves. The shear die set 18 is pushed by plate assemblies 60, 62 on which lever 22 bears through fasteners 46, bearings or bushings 64 and pins 66.

Carried apertures 56 in arm 34 are shear die pushrod assemblies 58. These are pushed by plate assemblies 60, 62 on which lever 22 bears through fasteners 46, bearings or bushings 64 and pins 66.

The welderhead 10 will pull the rail, weld a rail shear the welded rail, and hold the welded rail until the weld cools adequately. It may be contained as a single unit and suspended either from a single point or multiple points. The welderhead 10 is formed and arranged so that no part of the welderhead 10 will extend below the bottom surface of the rail base, except for the shear tooling. The welderhead 10 will be shielded from damage which may be caused by the welding process from weld initiation through rail shearing. The design described herein may be expected, when optimized, to enable a Welder/Puller Combo that, despite its high capacity, the welderhead 10 will, when fully closed for storage, fit within an envelope of 7' long×4' wide×4' high. The weight of the welderhead 10 when fully operational may feasibly be such that it can be carried in an over-the-road truck or van (not shown) that, when fully fueled and operational will be road legal without permits in most of the 50 states. The optimized design consistent with the teachings herein may be expected to have the operational advantage that only one man will be necessary to operate the equipment. The welderhead 10 will be able to make welds in low, maintenance and high stress applications.

In FIG. 5, the shear die set 18 has a pair of brackets, 70, 72 pivotally connected, at pivot 74 and a pair of replaceable die members 76, 78. These are fitted as described above and actuated with the mechanism also described.

The welderhead 10 of the design and having the features taught herein is capable of producing 20 non-stressed or about 4–6 tension welds per hour in-track. This includes Positioning and Placement of the welderhead 10, clamping to the rail, completing an about 7" rail pull, aligning to specification, preheating, flashing, forging and shearing the weld-release of the rail and removal from the rail.

The welderhead 10 taught herein has a weld cycle time from weld initiation until completion of shearing for 136 lb./yd. rail of about three (3) minutes. The welderhead may be expected to produce 15,000 welds between major overhauls.

The general standards for rail welding, including rail sizes and sections, specifications for Steel Rails, Fabrication of Continuous Welded Rail and rail metallurgies are set forth in the 1996 issue of publications of A.R.E.A. (American Railway Engineering Association). This organization has since merged with other engineering support organizations to form AREMA; the American Railway Engineering and Maintenance-of-Way Association. Specifically, the publications 1996 A.R.E.A. design of Recommended Rail Sections; 1996 A.R.E.A. specifications for Steel Rails; 1983 A.R.E.A. specification for Fabrication of Continuous Welded Rail; 1996 A.R.E.A. Standard for Rail metallurgies to be welded; 1996 A.R.E.A. High-Strength Grade designations; and 1986 Grades 700, 900A, 900B and 1100 are incorporated by reference as if fully set forth herein. Rail welds produced by the welderhead 10 will comply with the latest issue of the A.R.E.A. specification for Fabrication of Continuous Welded Rail except for section 2.2.2.b.(2); the first two sentences, 'Horizontal alignment . . . Field side.' While the welder/puller combo can meet the above described standards, the invention is not intended to be limited to any particular set of regulatory standards.

In operation, two opposite pairs of quadrants will close on rail providing rail clamping by engagement of pads on rail. Clamping force is imparted and clamping pressure maintained by cylinders. The rail clamping forces will be sufficient to avoid any slippage between the welderhead 10 and the rail. Trunnions slide longitudinally on shaft their motion being imparted by cylinders. With this mechanism, the welderhead 10 will be able to reverse its direction of operation and accomplish its full range of rail pulling (200 tons) and pushing (40 tons) without loosening its clamp seat or changing the weld alignment.

The arrangement of arms and clamping electrode enable welderhead 10 to clamp and weld rails which are 3.5 feet in length or longer. The relationship between the electrode clamping force, the electrode contact area and the maximum welding current is such that no adverse metallurgical (martensite) or surface (metal displacement) conditions occur at any time during the weld process and also such that the electrodes do not plastically deform (mushroom).

The material, size, surface and clamping force applied through electrode are formed and arranged such that contact with the rail does not produce any vertical surface deformations deeper than about 0.040 inch and with a root radius less than about 0.062 inch and does not form any horizontal deformations. Any surface deformations that do form will, in any event, not be within the Heat Affected Zone (HAZ) produced during welding. The precise level of control of clamping, utilizing controls, valves and hydraulic hoses and fitting is also such that "soft clamping" of the rails can be accomplished to facilitate alignment.

A major advantage of the welderhead 10 of the invention is the ability to combine in a single unit, the ability for the three functions of rail pulling, flash butt welding, shearing and maintaining the "after forged" position. The horizontal plane of force of the rail pull will have a mechanical adjustment to approximately match the neutral axis of all rail sizes specified. The welderhead 10 has a rail pulling (together) ability of about 200 tons. The pulling ability will be sufficient for moving and stretching substantially all rail sections currently used in the field. It will be typically able to overcome tensile and frictional resistance of steel rail lengths of up to about one quarter to one third of a statute mile in length, as well as forging the rail ends together and maintaining that position after forging.

The welderhead 10 will have a rail pushing (apart) ability to the limit of the rails, before rail buckling occurs, typically 40 tons. The push-ability will be used for resisting longitudinal rail compressive forces and reversing the inward movement of the rail to maintain stable flashing and reverse out of a butt-up (short) situation. The proper forging force will be achievable and constant regardless of the rail pulling load previous to forging.

In addition to the force able to be applied, the distance or stroke of the welderhead is advantageously configured. The total usable stroke for longitudinal rail movement is about 7 inches. The stroke of the welding electrode assemblies will allow for a total rail consumption during welding of two (2) inches. The stroke may be divided approximately as follows:

1) about 0.25 inch total for squaring of rail ends,
2) about 0.50 inch for flashing previous to forging,
3) about 0.50 inch for forging distance,
4) about 0.75 inch for additional flashing, additional forging, consumption during preheating or other requirements as necessary.

The welding electrode assemblies, and ancillary components as necessary, will automatically mechanically re-stroke after weld process completion.

Vertical and horizontal measurements of weld geometry for compliance with the AREMA specifications will be taken at the top center of the rail head and at the gauge location (0.625 inch below top center) on the gauge side of the rail head. Alignment will be made using a 3' long×2' high×¼' wide straight edge. Vertical alignment will be achieved with the entire weight of the welderhead 10 in place on the rail. Horizontal alignment of the rail in the welderhead 10 shall be done on the web of the rail. In curved territory, initial horizontal alignment will be achieved with gauge bars.

Once weld alignment has been established by the welderhead 10 and the weld process initiated, the established weld alignment will not change throughout the weld process completion and until the induced stressing force, if any, is completed. The welderhead 10 will make the final horizontal and vertical adjustment and not allow a horizontal or vertical offset to occur during forging. The ability to maintain clamping pressure throughout the process, including the shearing operation, not only insures the maintenance of proper alignment, but also minimizes such stresses as may be induced in a cooling weld by the release of a quadrant pair for the shearing operation.

The welderhead 10 will be electrically insulated to prevent any welding current flow by-passing the weld. Welding electrodes and transformers will be situated to ensure that the secondary current loop is minimized. The welding electrodes will be adjustable to accommodate the various rail sizes specified. Electrodes can be a single alloy, a composite of two or more elements or laminated materials.

The welding of rails which have been previously drilled for installation of rail joints or to facilitate handling must be considered with respect to welding current transfer. Rail drilling-patterns to be accommodated are as shown in the latest issue (1995) of the A. R E. A. design of Recommended Rail Sections. Six hole bars with the four outside holes drilled will have required current transfer parameters calculated by the control system. As described previously, while the welder/puller combo can meet the above described standards, the invention is not intended to be limited to any particular set of regulatory standards.

As described above, weld shearing is an essential step in the production of a suitable, finished welded rail. On new rail, forged material needs to be sheared to within 0.068 of the parent rail contour. In this invention, the shearing process will be accomplished without relaxation of the clamp cylinders. The shearing function will be a fully (automatic function programmed as part of the weld cycle.

Shearing may be accomplished in three stages, a single stage, multiple stages or a progressive stage. The shearing arrangement will not produce any shear drag, stress risers or cut into the parent rail section. In locating the weld and welderhead, it will be important to locate the weld so that shearing will take place in the crib area and not over a tie.

The welderhead is designed so that an area between the quadrants is defined. This area is known as the firebox. The firebox will be large enough that, when the welderhead 10 is in the fully closed position, the firebox will be able to contain the fully sheared weld, the shear die and the sheared weld collar. Also, the sheared weld collar shall at no time come under compression.

A typical control system will control the following functions from the operator control station. Many of these functions are known to one of ordinary skill in the art. The manually controlled functions are: Rail pulling/pushing/welding, Rail end squaring (to achieve full face flashing), Program by-pass, Re-shearing, Weld program stop, Emergency stop, Program extend, Program select A or B (in truck, not on operator control) Post-heat initiation, Electrode clamp/release, Alignment, Dry cycle/auto burn off, Welder up/down, Boom in/out, Boom left right, Weld program start, Puller clamp/release and Free/Closure —Opens to full stroke or 85 mm.

The control system program will automatically control the functions of: Preheating, Flashing, Accelerated flashing, upsetting (forging and holding), Shearing and Selectable post-heating. Selectable post-heating when included in the program will be controlled from the truck, not on operator control station.

The mode of upsetting to a fixed distance or refusal and the mode of preheating (flashing, pulsation or shorting) will be selectable by the operator at the program control station. The upsetting force for refusal will be optimally selectable from about 36 to 72 tons in increments of about one ton regardless of any rail drag or tension. Upsetting force, when welding to refusal, will not vary by more than one ton.

The total range for upset distances will be in selected increments and upsetting distance when welding to fixed distance, will not vary outside acceptable tolerances.

The control system will control rail ends to prevent interruptions in flow of current and shorting (extinguishing of the arc) for 3 cycles or greater during flashing or accelerated flashing. The variables in the above functions will be manually controllable from the programming control station. The control may be adapted to limit the ability of the welderhead 10 to reverse beyond the point of the original set up position, minimize total rail consumption and minimize machine over capacity.

Transducers will measure Welding current Welding platen position and Pulling/Upsetting force. Reporting progress and performance can be preferably included on performance factors such as slippage detection during forging between the rail pulling clamps and the rail, track spring rate and total rail consumption. Monitoring these can signal a go/no go decision. Upon completion each weld can have reported secondary current interruptions, upsetting (forging) distance, force and cooling hold time and then compared to standards.

The control system will also preferably monitor current flow, cur rent (instantaneous) platen position (to determine stroke), current (instantaneous) force (to determine available force).

A typical operation may be performed with the following steps. First, the operator measures the rail gap and compares it to the acceptable range. Second, the operator lowers welderhead 10 to rail 16 using boom controls. Third, the operator places right hand side of welderhead 10 in welding position and clamps the welding machine a specific distance from the rail end. The shear die may be integral or then be manually put in place.

Fourth, the welderhead itself will pull and stretch the rail until rail ends butt welderhead automatic stop. As part of this step, the machine may re-coil by relieving pressure to upset cylinders and then, determine gap, pull force and preferably provides information to enable a go/no-go decision to the Weld Monitor. A no-go signal disables the welding function and gives an explanation of the reason to a Weld Monitor. The mechanical functions could be performed, albeit less efficiently, without the automatic Weld Monitor function. Fifth, if necessary, the operator can release for vertical adjustment, then re-clamp and repeat step four several times.

Sixth, the welderhead 10 is started to move to the start weld position. The left hand side will release and reposition to allow proper stroke and, then re-clamp.

Seventh, the weld cycle is performed involving the sub-steps of (a) burn off, (b) preheat, (c) flashing, (d) acceleration flashing, (e) upsetting (forging & holding), (f) shear & retract and (g) post-heating.

Eighth, welderhead 10 holds rail under tension until sensor signals proper rail temperature has been reached and enables manual release.

Ninth, the operator activates manual release to automatically relax the rail pull force and unclamp the welderhead 10 from the rail.

Last, the operator raises welderhead 10 and moves to next weld.

The operator can interrupt and restart the weld program by stopping the cycle and opening the control contact and interrupting the weld program. Operator takes over manual operations. Any repositioning or delayed restart will cause the control to be restarted from beginning of the cycle. Otherwise, the cycle resumes from the point of stoppage. The operator can relax all hydraulic pressure and stop all electricity by shutting down the engine.

While the present invention has been disclosed and described with reference to a single embodiment thereof, it will be apparent that variations and modifications may be made therein. It is also noted that the present invention is independent of the machine being controlled, and is not limited to the control of flash butt rail welding machines. It is, thus, intended in the following claims to cover each variation and modification that falls within the true spirit and scope of the present invention.

What is claimed is:

1. A rail welderhead comprising:

two opposing pairs of quadrants constructed and arranged to close on adjacent rail sections and provide rail clamping by engagement of pads provided on the rail sections, the opposing pairs of quadrants defining a firebox therebetween; and a shear die fully enclosed within the firebox such that, when the welderhead's opposing quadrants are in a fully closed position, the shear die, a fully sheared weld, and a weld collar are contained within the firebox;

wherein the opposing pairs of quadrants are operative to pull and stretch the adjacent rail sections;

said quadrants pull and stretch adjacent rail sections with a force of between about 150 to 200 tons.

2. A rail welderhead comprising:

two opposing pairs of quadrants constructed and arranged to close on adjacent rail sections and provide rail clamping by engagement of pads provided on the rail sections, the opposing pairs of quadrants defining a firebox therebetween; and a shear die fully enclosed within the firebox such that, when the welderhead's opposing quadrants are in a fully closed position, the shear die, a fully sheared weld, and a weld collar are contained within the firebox;

wherein the opposing pairs of quadrants are operative to pull and stretch the adjacent rail sections;

said quadrants imparting an upsetting force of between 35 to 73 tons.

3. A flash butt welderhead with clamping quadrants defining a firebox therebetween comprising:

said welderhead has a rail pulling capacity sufficient for moving and stretching substantial lengths of rail to overcome tensile and frictional resistance of steel rail lengths of up to about one quarter to one third of a statute mile in length, as well as forging the rail ends together and maintaining that position after forging.

4. The rail welderhead of claim 1, further comprising:

said welderhead has a rail pulling capacity of 200 tons.

5. The rail welderhead of claim 3, further comprising:

said welderhead having a shear die assembly movable in the firebox to shear forged material to within about one eighth inch of the parent rail contour;

the firebox being large enough that, when the welderhead is in the fully closed position, the firebox will be able to contain a fully sheared weld, the shear die and a sheared weld collar;

said shearing accomplished without relaxation of the clamp cylinders.

6. The rail welderhead of claim 3 further comprising:

a shear die set with a sectional shape corresponding to the sectional shape of a cold rail;

said shear die set being fit loosely on the cold rail and after flash butt welding by said welderhead, said shear die is actuated through push rods whereby a single welderhead can be used for pulling and stretching rail strings and flash butt forging while the rails are under tension said shear die operation occurring without releasing rail tension and forging load.

7. The rail welderhead shear die of claim 4 further comprising:

said shear die being actuated by a lever;

said lever is supported on a stay assembly and reaction rod against which the compressive force of shearing is borne, the reaction rod being mounted on an arm;

shearing force is exerted by a force actuating device acting through a pin and clevis attached to lever, the force actuating device being mounted with a trunnion mount assembly to a trunnion, such that the lever is adapted to move relative to the quadrants and the shear die acting through pushrod assemblies.

* * * * *